United States Patent [19]

Holland

[11] 4,411,612

[45] Oct. 25, 1983

[54] APPARATUS FOR RECOVERING PRECIOUS METALS FROM THEIR ORES

[75] Inventor: Larry D. Holland, Dallas, Tex.

[73] Assignee: NEHA International, Dallas, Tex.

[21] Appl. No.: 330,133

[22] Filed: Dec. 14, 1981

Related U.S. Application Data

[62] Division of Ser. No. 254,888, Apr. 16, 1981, Pat. No. 4,374,097.

[51] Int. Cl.$^3$ .......... A01J 21/00; B29F 5/00; A23G 1/20; B29D 7/00

[52] U.S. Cl. .......... 425/365; 425/222; 425/331; 425/DIG. 101; 425/DIG. 230

[58] Field of Search ... 425/365, DIG. 230, DIG. 101, 425/331, 222

[56] References Cited

U.S. PATENT DOCUMENTS

| | | | |
|---|---|---|---|
| 588,476 | 8/1897 | Rhodes | 423/27 |
| 2,009,667 | 7/1935 | Keyes | 423/29 |
| 2,164,164 | 6/1939 | Price | 425/222 |
| 2,252,900 | 8/1941 | Shofer | 425/331 |
| 2,252,900 | 8/1941 | Shafer | 425/311 |
| 2,764,951 | 10/1956 | Fisher | 425/331 |
| 2,771,347 | 11/1956 | Beck et al. | 425/365 |
| 4,022,563 | 5/1977 | Spencer | 425/365 |
| 4,029,459 | 6/1977 | Schmiedeke | 423/331 |
| 4,256,706 | 3/1981 | Heinen | 423/29 |

*Primary Examiner*—H. S. Cockeram
*Attorney, Agent, or Firm*—Dennis T. Griggs

[57] ABSTRACT

Apparatus for extracting precious metals from their ores in which the ore is particulated and mixed with a binding agent to form a paste. The paste material is discharged into a rotary drum at an extruding station where it is pelletized by forcing it through a perforated sidewall of the drum. The pellets are discharged onto a conveyor belt and are transported to a spray station where they are wetted with a lixiviant solution. The lixiviant coated pellets are then dried by exposure to a heated air stream at a drying station as they are transported to an open air curing stockpile. The cured pellets are heaped in a pile and are then washed with a water spray to yield a pregnant solution of a precious metal salt.

4 Claims, 4 Drawing Figures

APPARATUS FOR RECOVERING PRECIOUS METALS FROM THEIR ORES

This application is a division of Ser. No. 254,888, filed Apr. 16, 1981, now U.S. Pat. No. 4,374,097.

BACKGROUND OF THE INVENTION

1. Field of the Invention

This invention is related to hydro-metallurgical apparatus for the recovery of precious metals from their ores, and in particular, to the recovery of precious metal values from ores, concentrates, tailings and other products of mining and metallurgical operations.

2. Description of the Prior Art

Precious metal values such as gold and silver may be extracted from their ores by a leaching process. The ores may be specifically mined for their gold or silver content, or the metals may be recovered from tailings or other by-products when a base metal, such as lead, zinc, and copper are refined. The term "precious metal value" is generally understood to refer to gold, silver, platinum and the metals of the platinum group, including osmium, ruthenium, iridium, palladium and rhodium.

According to conventional practice, precious metal values are recovered from their ores by smelting or by a cyaniding process in which the ore is treated with cyanide compounds, usually in an alkaline medium, to complex out the precious metals. The precious metal values are then separated from the cyanide solution by precipitation of the cyanides or by addition of a carbonaceous, sorbent material followed by floatation and reduction of the cyanide concentrate.

The use of the cyanide leaching process has been limited because of the poisonous nature of the cyanide compounds. The practice of open air spraying of tailings with a cyanide solution, while economical, is harmful to the environment, in particular to wildlife and natural water supplies. Moreover, the open air lixiviant spraying of tailings is relatively inefficient because of the relatively large volume of lixiviant solution required and because the exposed surface area per unit volume of tailings is relatively small.

OBJECTS OF THE INVENTION

Therefore, it is the principal object of the present invention to provide apparatus for the recovery of precious metal values by a leaching process in which leaching solutions, including toxic compounds such as cyanide, may be used efficiently with minimum risk of environmental contamination.

Another object of the present invention is to provide a simple, economically feasible apparatus for the extraction of precious metal valves from ores, tailings, concentrates and other products of mining and metallurgical operations.

A further object of the invention is to retain the advantages of using a toxic leaching agent such as cyanide in the extraction of precious metals from ores in a recovery process in which the leaching agent is carefully applied and conserved.

Yet another object of the invention is to increase the efficiency of a leaching agent in a hydro-metallurgical recovery process.

SUMMARY OF THE INVENTION

The foregoing and other objects are achieved in one aspect of the present invention by producing a paste of particulated ore and binding agent and extruding the paste to form pellets. The pellets are wetted with a lixiviant such as an aqueous solution of sodium cyanide. The cyanide coated pellets are then dried. The dried pellets are heaped in a pile within a large collection tank. The pellets are then washed with a water spray thereby yielding a pregnant solution of a precious metal salt. The pregnant solution collected in the tank is pumped to a holding tank for further separation and reduction by conventional techniques.

According to an important aspect of the invention, the paste producing step is carried out by first particulating the metal bearing ore and mixing it with a binding agent such as lime. Enough water is added to the ore and binding agent mixture to form a high slump mud or paste.

The pellets are produced in a rotary drum which is provided with a perforated sidewall. A free wheeling cylindrical roller received within the drum forces the paste material through the sidewall perforations in response to rotation of the drum.

According to an alternate method, instead of spraying the lixiviant solution onto the pellets after they have been extruded, the lixiviant solution is mixed with the binder and particulated tailings to produce the paste, which is thereafter extruded to produce the pellets. The pellets are thereafter washed to yield the pregnant solution.

The novel features which characterize the invention are set forth in the appended claims. The nature of the invention, however, as well as its essential features and advantages, will be more fully comprehended upon consideration of an illustrative embodiment, when read in conjunction with the accompanying drawings, wherein:

DETAILED DESCRIPTION OF THE PREFERRED EMBODIMENTS

Figure 1:
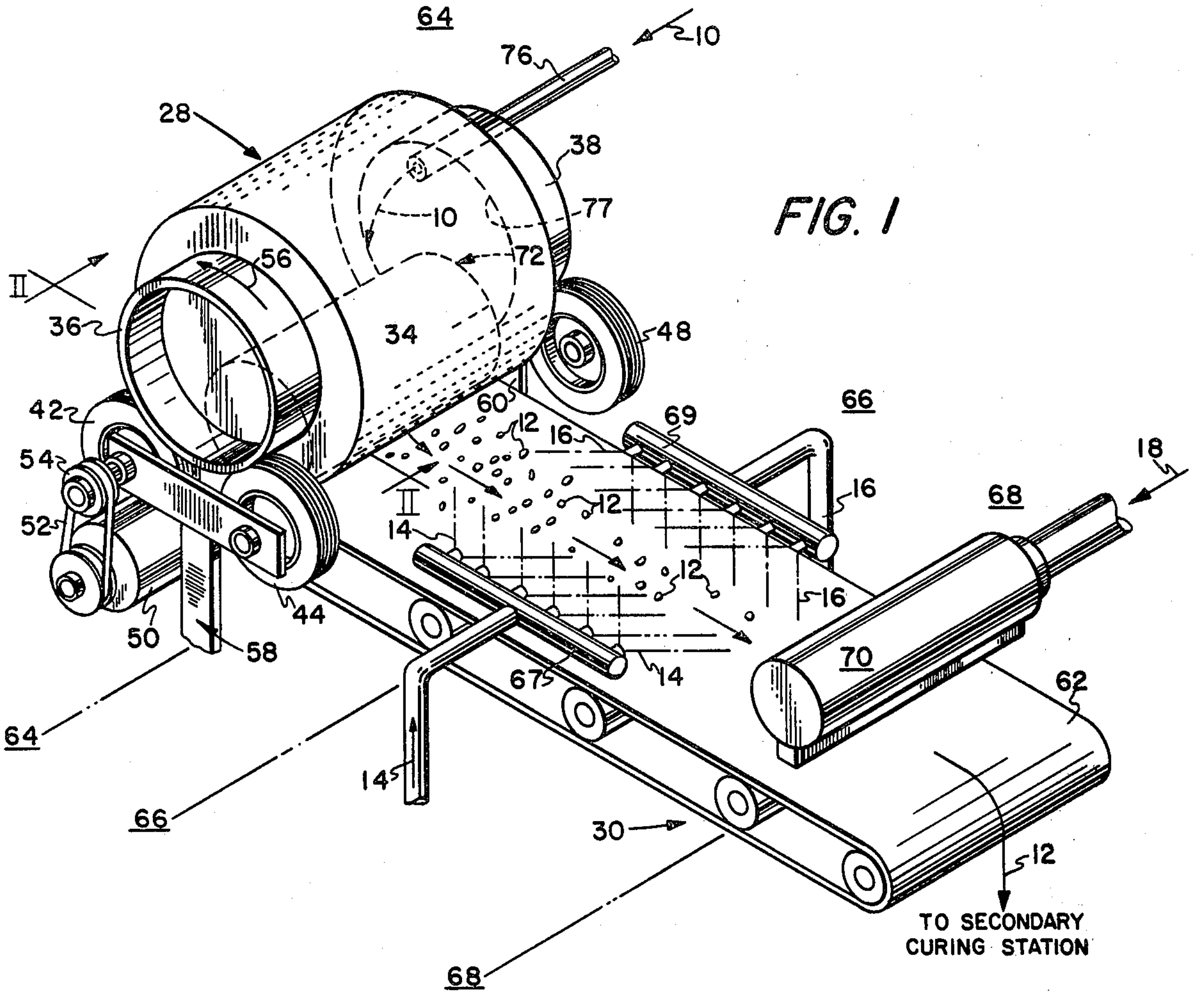
FIG. 1 is a perspective view which illustrates the pellet processing apparatus of the invention.

In the description which follows, like parts are marked throughout the specification and drawings with the same reference numerals, respectively. The drawings are not necessarily to scale and in some instances portions have been exaggerated in order to more clearly depict certain features of the invention.

Figure 4:
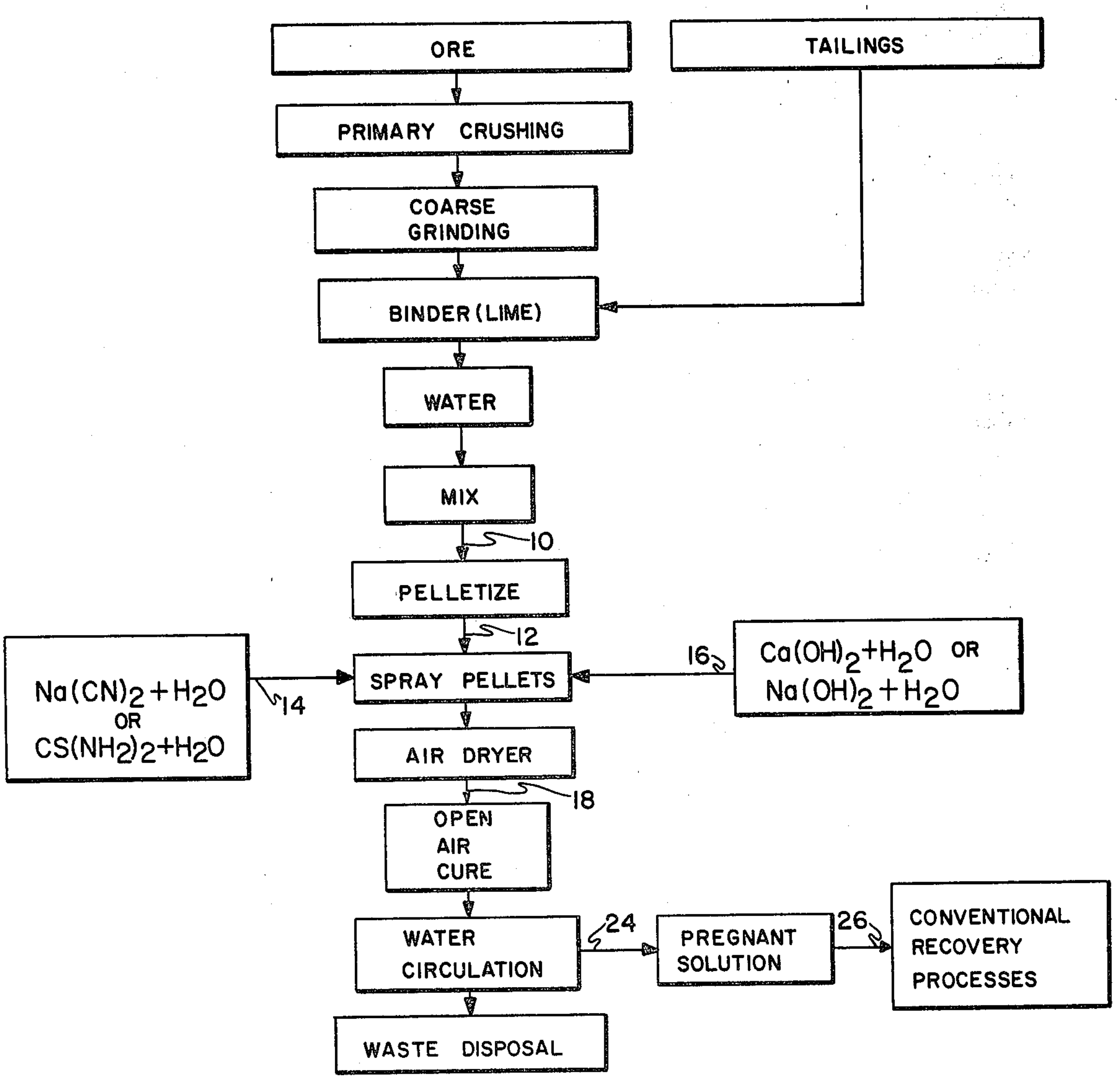

The method of the invention is indicated schematically in FIG. 4 for processing a material in which a precious metal is lodged, for example ores, concentrates, tailings, slag and other products of mining and metallurgical operations. A run of mine ore undergoes primary crushing to a size of approximately three millimeters diameter. After primary crushing, the ore undergoes coarse grinding to a particle size of one millimeter or less diameter. The coarse grindings have a sand-like consistency and are free flowing. Next, the coarse grindings are mixed with water and a binding agent such as lime to form a high slump mud or paste 10 (FIG. 1).

Tailings, if available, may be mixed directly with the binder, since they are the crushed product of a previous milling process.

According to an important aspect of the invention, the paste material is extruded to form pellets 12 (FIG. 1). The pellets are then wetted with a lixiviant 14, preferably in the presence of an alkaline solution 16. Preferred lixiviant solutions are alkaline solutions of sodium cyanide, potassium cyanide or thiourea (thiocarbamide). As can best be seen in FIGS. 1 and 4, an aqueous solution 14 of sodium cyanide is sprayed onto the pellets in the presence of an alkaline solution 16 of sodium hydroxide or calcium hydroxide to provide protective alkalinity during cyanidation.

The preferred lixiviants for use in the invention are alkaline solutions of sodium cyanide or potassium cyanide. As used herein, the term "lixiviant" means a leaching agent which is capable of extracting a soluble component from a solid mixture in a washing or percolation process.

Figure 3:
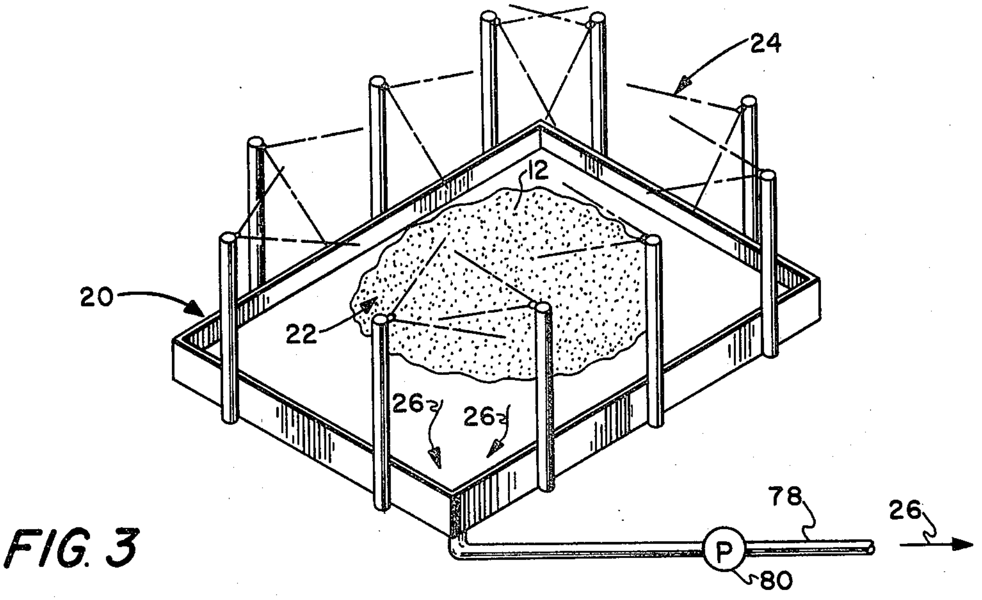
FIG. 3 is a perspective view of a collection tank in which lixiviant coated pellets are washed to yield a pregnant solution of a precious metal salt; and, FIG. 4 is a flow diagram of a preferred process for the hydrometallurgical recovery of precious metal values from tailings.

After being coated with cyanide, the pellets 12 undergo preliminary curing and drying by exposure to a heated air stream 18, with the drying process being completed by open air curing. Preferably, the tailing pellets 12 are stockpiled for subsequent processing in a wash tank 20 as indicated in FIG. 3. The pellets 12 are heaped in a pile 22 in the center of the tank and then are washed by a water spray 24. The wash produces a pregnant solution 26 which contains the precious metal values. The pregnant solution is pumped away to a holding tank (not shown) where it undergoes further separation and reduction.

Figure 2:
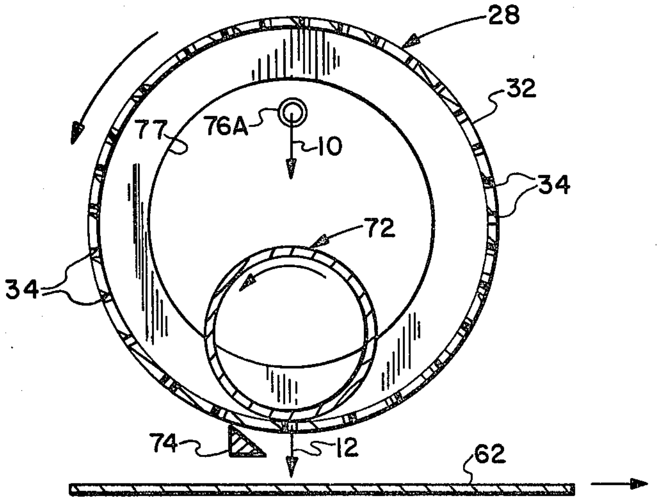
FIG. 2 is a sectional view of a rotary extruder apparatus taken along the lines II—II of FIG. 1.

Referring now to FIGS. 1 and 2, the paste material 10 is pelletized in a rotary drum 28 which is supported for rotary motion above a conveyor assembly 30. The rotary drum 28 has a perforated cylindrical sidewall 32 through which the paste material 10 is extruded. The openings or perforations 34 are evenly spaced over the surface of the sidewall 32.

The rotary drum 28 is provided with rotary hubs 36, 38 at opposite ends which rest upon a turn cradle assembly 40. The turn cradle assembly 40 includes rubber rollers 42, 44 which provide rolling support for hub 36, and rollers 46, 48 which provide support for hub 38. Roller 42 is coupled to a drive motor 50 by a belt 52 and pulley 54. In response to clockwise rotation of the roller 42, the extruder drum 28 rotates in a counterclockwise direction as indicated by the arrow 56. The roller wheels 42, 44, 46, 48 are rotatably supported on stanchions 58, 60 on opposite sides of the conveyor assembly 30.

The rotary extruder drum 28 is vertically spaced above the conveyor belt 62 as can best be seen in FIG. 2. The location of the extruder drum 28 will be referred to as the extrusion station 64. The conveyor belt 62 carries the pellet extrusions 12 from the extrusion station 64 to a spraying station 66 where they are wetted by the sodium cyanide spray 14 and the sodium hydroxide spray 16. According to this arrangement, the pellets 12 become coated with the sodium cyanide solution in the presence of the sodium hydroxide alkaline medium. The sodium cyanide solution 14 is discharged through a spray bar 67, and the sodium hydroxide solution 16 is discharged through a spray bar 69.

After being saturated with the sodium cyanide, the pellets 12 are transported to a drying station 68 where they undergo a first stage of curing by exposure to the heated air stream 18. The heated air stream 18 is directed onto the pellets by a blower assembly 70. Although only one blower assembly 70 is illustrated, it should be understood that one or more additional blower assemblies may be required to dehydrate the pellets sufficiently so that they can be handled without sticking together. After undergoing the preliminary drying operation, the cyanide coated pellets are transported to an open air drying facility for further curing.

Extrusion of the paste material 10 is performed by a free wheeling cylindrical roller 72 which is received within the extruder drum 28 for forcing the paste material 10 through the sidewall perforations 34 in response to rotation of the drum. The free wheeling roller 72 is preferably a large diameter, stainless steel cylinder having a diameter equal to thirty-five percent (35%) to forty percent (40%) of the extruder drum diameter. The roller cylinder 72 is free wheeling in the sense that it is not mechanically coupled to the extruder drum 28, but merely rests against the inside diameter of the extruder drum sidewall 32. Because of the heavy weight of the roller cylinder 72, the paste material 12 is forced through the perforations 34, thereby producing an elongated pellet. The pellets 12 are ejected downwardly through the perforations 34 onto the top of the conveyor belt 62. Those pellets which cling to the outside of the extruder drum sidewall 32 are scraped away by a closely positioned scraper blade 74.

The paste material 10 is conveyed from a mixing vat (not shown) through a conduit 76 which has a delivery end 76A inserted inside a circular opening 77 in one end of the rotary drum 28. Thus, the rotary drum 28 is free to rotate without rubbing against the conduit 76.

According to a variation of the method of the invention, the lixiviant agent is premixed with the particulated ore and binding agent to form the paste 10. According to this method, spraying of sodium cyanide and sodium hydroxide is not required, with the lixiviant coated pellets 12 being transported directly to the drying station 68.

From the foregoing description of the certain preferred embodiments of the invention, those skilled in the art will appreciate that the method and apparatus of the present invention greatly enhances the leaching effect of a toxic lixiviant such as cyanide while substantially preventing contamination of the environment. Although the invention was conceived primarily as a processing system for tailings, the method and extruding apparatus can be used on virgin ore.

The pregnant solution 26 is conveyed through a conduit 78 by a pump 80 to a holding tank. At this point, the precious metal values may be separated from the pregnant liquor solution by conventional separation and reduction methods. For example, the pregnant liquor solution 26 may be treated with zinc shavings which cause the precious metal compounds to precipitate. The precious metal precipitate is then dissolved in aqua regia. Oxalic acid is added to precipitate gold, followed by the addition of formic acid to precipitate platinum. The remaining residue in the reaction vessel may contain silver chlorides which may be extracted by standard smelting methods. Alternatively, the gold or silver may be recovered electrolytically.

Although certain preferred embodiments of the invention have been described in detail, it should be understood that various changes, substitutions and alterations can be made therein without departing from the spirit and scope of the invention as defined by the appended claims.

What is claimed is:

1. Apparatus for processing a paste of ore and binder material comprising:

a conveyor assembly;

an extruder drum supported for rotation above said conveyor assembly at an extruding station, said extruder drum having a chamber for receiving the paste material and having a perforated cylindrical sidewall enclosing said chamber;

a free wheeling cylindrical roller received within said drum for forcing the paste material through the drum sidewall perforations and depositing the paste in the form of pellets onto the conveyor assembly in response to rotation of said drum;

drive means coupled to said drum for rotating said drum;

a spray bar disposed adjacent said conveyor assembly at a spraying station for spraying a lixiviant solution onto pellets transported by said conveyor assembly from the extruding station to the spraying station; and a dryer assembly disposed adjacent said conveyor assembly at a drying station for drying the lixiviant coated pellets as they are transported by the conveyor assembly from the spraying station.

2. Apparatus for processing a paste of ore and binder material comprising, in combination;

a conveyor assembly;

apparatus mounted above the conveyor assembly for extruding the paste into a rotary drum to form pellets and for dropping the extruded pellets onto the conveyor assembly; and, apparatus comprising spray bars for coating the pellets with a lixiviant solution as the pellets are transported by the conveyor assembly.

3. Apparatus as defined in claim 2, including apparatus comprising blower assemblies mounted above the conveyor assembly for drying the coated pellets as the pellets are transported by the conveyor assembly.

4. Apparatus as defined in claim 2, wherein said coating apparatus comprises a spray bar disposed above said conveyor assembly.

* * * * *